M. & S. L. SEWARD.
Seed Planter.
No 1,264.
Patented July 27, 1839.
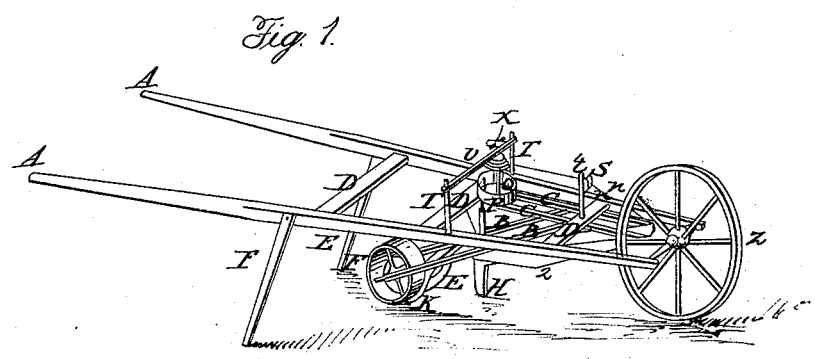
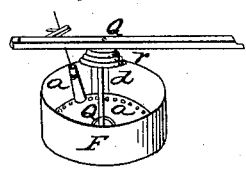
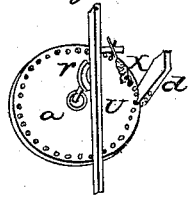
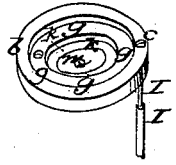

UNITED STATES PATENT OFFICE.

MARTIN SEWARD AND SAMUEL LEE SEWARD, OF GUILFORD, CONNECTICUT.

IMPROVEMENT IN MACHINES FOR SOWING SEED.

Specification forming part of Letters Patent No. 1,264, dated July 27, 1839.

*To all whom it may concern:*

Be it known that we, MARTIN SEWARD and SAMUEL L. SEWARD, both of Guilford, in the county of New Haven and State of Connecticut, have invented and applied to use a new and useful improvement in the machinery and method of sowing garden and field seeds in drills, called the "Horizontal Drill-Barrow or Seed-Sower;" and we do hereby declare the following is a full, clear, and exact description of the construction and operation of the same, reference being had to the annexed drawings, making a part of this specification, in which—

Figure 1 represents a perspective view of the barrow; Fig. 2, an oblique view of the seed-box and the horizontal plate; Fig. 3, a vertical view of the same with the pinion-wheel, and Fig. 4 the pinion-wheel; Fig. 5, the wooden bottom of the seed-box.

By this improvement the seeds are separated and sown singly at suitable and appropriate distances from each other, graduated according to the kind of seed to be sown, and is effected by crowding them singly through a series of holes in the revolving horizontal plate in the bottom of the seed-box by the pinion-wheel, whence they are conveyed through a hole or funnel in the bottom of the box into a tube and a furrow made by the colter of the machine at suitable distances as it moves, and covered with the shares of the machine.

This machine is connected with a small light wheelbarrow of nearly the common form, as represented in Fig. 1.

The seed-box, (marked P, Figs. 1 and 2,) is a cylindrical tin box of five inches in diameter, and of about the capacity of three half-pints, and is situated behind the wheel of the barrow eight or nine inches. It has a wooden bottom, Fig. 5, upon which the circular revolving plate *a* fits closely for about three-fourths of an inch on the edge. At that distance a circular groove in the bottom, as shown by Fig. 5, *g g g g*, about an inch wide, is hollowed down to receive any dust that may collect between it and the revolving plate, which is discharged through a hole (marked *h*, Fig. 5) through the bottom. This is merely that the revolving plate may not clog by the dust.

The revolving horizontal plate *a* is of the size of the bottom of the seed-box, fitting so closely about its circular edge as to admit no seeds, and is propelled by a band, *n n*, leading from the whirl on the hub of the wheel of the barrow round the whirl of its own vertical shaft, (whirls marked *r r*, Figs. 1, 2, and 3, and shaft marked Q,) carried over pulleys (marked *s s*) on a stanchion, *t*, fitted for that purpose upon one of the cross-beams of the barrow D, so as to change the vertical revolutions of the wheel of the barrow to horizontal in the revolving plate at the bottom of the seed-box. The whirls *r r* on the hub of the wheel of the barrow and on the shaft of the revolving plate are each so graduated by shifting the band as to vary the velocity of the revolving plate according to the kind of seed to be sown. The shaft Q of the plate *a* is fitted at one end into the wooden bottom of the box and at the other end into a cross-beam, U, supported by two upright posts, T T, in the sides of the barrow. The horizontal plate *a*, made of zinc or other metal, is fastened on the bottom of the shaft Q by a nut and washer moving in the grooves *k k k m*, Fig. 5, between it and the bottom, and may be easily removed and supplied with other similar plates, varying from one-twentieth to one-fourth of an inch in thickness, according to the kind of seed to be sown. Each of these horizontal plates is pierced with a circular series of holes near its outer edge, as seen in Plate 3, *a*, of different sizes to fit various kinds of seed, and each large enough in each plate to admit a single seed of the kind to be sown. The plate used for sowing turnips, for instance, has sixteen holes, each of the size of a single seed. The plate for sowing onions has forty holes, and other plates are used of a different number and of different thickness, appropriate to almost every kind of seed to be sown, and according to the distances they are to be sown apart from each other.

A small brush, *x*, is fastened in the cross-beam U, in which the upper part of shaft Q moves, (represented in Figs. 2 and 3,) which brush is so arranged as to brush over the holes of the revolving plate *a* and leave a seed in each and hinder them from clogging.

In the inside of the seed-box, upon its side, a vertical pinion-wheel, *d*, with points of the length of the thickness of the thickest revolving plate, is fixed with a screw, the points so graduated that they play in the holes of the revolving plate and crowd the seed through after it is pushed in by the brush *x* in revolution of the plate *a*.

Immediately below the center of the pinion-wheel is a hole through the wooden bottom of the box, (marked *c*, Fig. 5,) communicating with the funnel and tube I I, Figs. 1 and 5, to conduct the seeds as they are pushed through the holes of the revolving plate into the said tube I, which receives the seeds and deposits them in the furrow made by the colter of the barrow H.

The colter H is fitted to the end of a beam, G, the upper part of which moves with a hinge between two small beams, C C, running lengthwise of the barrow on the under side, whereby the beam G is fitted so as to drop with the colter before the bottom of the tube I, making a suitable furrow for the seed. The tube is formed of tin, with two parts, the upper moving in the lower so as to allow the barrow to be raised or set down. The upper part of the tube is fastened at the top to the hole *c*, at the under side of bottom of the seed-box with a wire hinge to the beam D, the lower part with a similar one behind the colter H.

Behind the beam of the colter, and fastened to the small beams C C with a rod, are two other beams, B B, running transversely behind the colter H. Near the bottom they are connected with a cross-beam, L, in which are fixed two iron or metallic shares or points, K K, to cover over the seeds in the furrow as they drop from the tube I.

Below the cross-beam L, on an axle between the beams B B, is a wooden or cast-iron cylindrical roller, F, about seven inches in diameter and about four inches long, for smoothing down the ground behind the shares K K after the seeds are sown.

The side beams of the barrow are about four and one-half feet in length. The axle of the wheel is about ten inches and the wheel *z* itself about sixteen inches in diameter.

The barrow has three cross-beams marked D D D. From the axle of the wheel to the nearest bar is nine inches; from that to the next is nine inches, and from that to the next is five inches. The last is fifteen and one-half inches long and five-eighths of an inch thick. The first is twelve inches long.

The seed-box is fastened between the bars D D upon the cross-beams C C. The size of the seed-box may be varied. In some field-seeds it should undoubtedly be larger, especially rice or corn. The holes in the plate may be easily so varied that corn may be either planted in hills or rows.

Two seed-boxes may be fixed upon one barrow when convenient.

The pinion-wheel *d* is about one and one-half inch in diameter, and is formed of brass or other metal, and is secured to the inside of the cylindrical seed-box by a piece of wood or metal with a mortise for it to traverse. For cotton the length of the points may be increased so as to push every seed fairly into the tube I. The groove in which the pinion-wheel moves is fastened with a screw, and may be easily removed when turnip or other round seeds are sown, when it is not needed. It must be removed when the plates are changed.

The beam G of the colter is sixteen inches long, and is about two and one-half inches square. The colter is of cast-iron, sloping backward.

The beams to which the roller and points are attached are one and one-eighth by seven-eighths of an inch, and twenty-one inches long.

The whole barrow and machinery are light and portable, weighing, when complete, not more than from twenty to twenty-five pounds.

What we claim as our invention, and desire to secure by Letters Patent, is—

The revolving horizontal plate *a*, in combination with the seed-box P, as described, together with the pinion-wheel *d* and brush *x*, by which one seed is separated from the rest and sown singly at a time, and also the further combination with these of the funnel and tube I I, for conveying the seed into the furrow, and of the other parts of the barrow, as herein described.

Guilford, July 15, A. D. 1839.

MARTIN SEWARD. [L. S.]
  SAML. L. SEWARD. [L. S.]

Witnesses:
 R. S. SMITH,
 R. D. SMITH.